United States Patent
Lindenberger et al.

(10) Patent No.: US 11,829,996 B1
(45) Date of Patent: Nov. 28, 2023

(54) HYBRID ORGANIZATIONAL SYSTEM FOR DATA MANAGEMENT AND TRACKING

(71) Applicant: Phunware, Inc., Austin, TX (US)

(72) Inventors: Matthew Lindenberger, Austin, TX (US); Luan Dang, Austin, TX (US)

(73) Assignee: PHUNWARE, INC., Austin, TX (US)

( * ) Notice: Subject to any disclaimer, the term of this patent is extended or adjusted under 35 U.S.C. 154(b) by 0 days.

(21) Appl. No.: 16/395,147

(22) Filed: Apr. 25, 2019

(51) Int. Cl.
 G06Q 20/36 (2012.01)
 G06F 21/62 (2013.01)
 H04L 9/06 (2006.01)
 G06Q 50/00 (2012.01)
 H04L 9/00 (2022.01)

(52) U.S. Cl.
 CPC ....... G06Q 20/367 (2013.01); G06F 21/6218 (2013.01); H04L 9/0643 (2013.01); G06Q 50/01 (2013.01); H04L 9/50 (2022.05)

(58) Field of Classification Search
 CPC ............... G06F 21/6218; H04L 9/0643; H04L 2209/38; H04L 9/50; G06Q 50/01; G06Q 20/367
 See application file for complete search history.

(56) References Cited

U.S. PATENT DOCUMENTS

| | | | | |
|---|---|---|---|---|
| 7,895,445 B1 * | 2/2011 | Albanese | ................ | H04L 67/63 713/172 |
| 9,082,119 B2 * | 7/2015 | Ortiz | .................. | G06Q 20/3278 |
| 9,177,169 B2 * | 11/2015 | Shablygin | ........... | G06F 21/6218 |
| 9,378,498 B2 * | 6/2016 | Lu | ........................ | G06Q 20/343 |
| 10,102,510 B2 | 10/2018 | Yau et al. | | |
| 10,373,129 B1 * | 8/2019 | James | ....................... | H04L 9/06 |
| 10,438,290 B1 * | 10/2019 | Winklevoss | ......... | G06Q 20/389 |
| 10,547,594 B2 * | 1/2020 | Chang | ................. | H04L 63/0428 |
| 2009/0125918 A1 * | 5/2009 | Kansal | .................... | H04L 67/51 719/328 |
| 2012/0284747 A1 * | 11/2012 | Joao | ................... | H04N 21/6581 725/32 |

(Continued)

FOREIGN PATENT DOCUMENTS

WO WO-2017145048 A1 8/2017
WO WO-2018209222 A1 11/2018

OTHER PUBLICATIONS

"Decentralized Applications: The Blockchain-Empowered Software System"; Wei Cai, Zehua Wang, Jason B. Ernst, Zhen Hong, Chen Feng, and Victor C. M. Leung; (Year: 2018).*

(Continued)

*Primary Examiner* — John W Hayes
*Assistant Examiner* — Edgar R. Martinez-Hernandez
(74) *Attorney, Agent, or Firm* — TIPS Group (57) ABSTRACT

Described is a hybrid centralized-decentralized system for managing data and token transactions among a decentralized group of stakeholders. The system uses a blockchain architecture to maintain secure identities for the stakeholders, as well as allow any stakeholder to perform a data or token transaction with another stakeholder. A central organization manages a central application and a data exchange. The central application manages profile data from users and interaction data for users with developer applications, and provides it to the data exchange. The data exchange organizes and packages the data, and may provide it to other stakeholder for analysis.

11 Claims, 6 Drawing Sheets

(56) References Cited

U.S. PATENT DOCUMENTS

| | | | | |
|---|---|---|---|---|
| 2012/0291103 | A1* | 11/2012 | Cohen | G06F 21/6218 726/4 |
| 2013/0060618 | A1* | 3/2013 | Barton | G06Q 20/3223 705/14.23 |
| 2013/0268357 | A1* | 10/2013 | Heath | G06Q 10/10 726/26 |
| 2014/0200803 | A1* | 7/2014 | Kinoshita | G01C 21/3655 701/428 |
| 2015/0269539 | A1* | 9/2015 | MacGregor | G06Q 20/10 705/39 |
| 2015/0310476 | A1* | 10/2015 | Gadwa | G06Q 30/0226 705/14.27 |
| 2015/0348018 | A1* | 12/2015 | Campos | G06Q 20/18 705/41 |
| 2016/0085544 | A1* | 3/2016 | Sharma | G06F 8/20 717/120 |
| 2017/0109744 | A1* | 4/2017 | Wilkins | H04L 9/14 |
| 2017/0161735 | A1* | 6/2017 | Ortiz | G06Q 20/3278 |
| 2017/0337542 | A1* | 11/2017 | Kim | G06Q 20/16 |
| 2017/0351680 | A1* | 12/2017 | Selekman | H04L 67/306 |
| 2018/0025135 | A1* | 1/2018 | Odom | G06F 21/125 726/28 |
| 2018/0046623 | A1* | 2/2018 | Faith | G06F 16/9536 |
| 2018/0053173 | A1* | 2/2018 | Ballout | G06Q 20/4016 |
| 2018/0060496 | A1* | 3/2018 | Bulleit | H04L 9/0643 |
| 2018/0096543 | A1* | 4/2018 | Chamarti | H04W 88/10 |
| 2018/0182051 | A1* | 6/2018 | McIntyre | H04N 23/64 |
| 2018/0232809 | A1* | 8/2018 | Lord | G06Q 40/04 |
| 2018/0268401 | A1* | 9/2018 | Ortiz | G06Q 20/204 |
| 2018/0349485 | A1* | 12/2018 | Carlisle | G06F 16/9535 |
| 2019/0044703 | A1* | 2/2019 | Smith | G06N 3/063 |
| 2019/0102819 | A1* | 4/2019 | Bilotta | G16H 10/60 |
| 2019/0114334 | A1* | 4/2019 | Gunther | G06F 16/2358 |
| 2019/0116142 | A1* | 4/2019 | Chalakudi | H04L 67/1097 |
| 2019/0130386 | A1* | 5/2019 | Bhat | G06Q 20/322 |
| 2019/0179939 | A1* | 6/2019 | Govindarajan | G06F 11/1474 |
| 2019/0180266 | A1* | 6/2019 | Sidhu | H04L 63/102 |
| 2019/0268153 | A1* | 8/2019 | Kurian | H04L 9/3239 |
| 2019/0280861 | A1* | 9/2019 | Smith | G06Q 20/4015 |
| 2019/0286804 | A1* | 9/2019 | Chacko | G06F 21/606 |
| 2019/0333030 | A1* | 10/2019 | Ramasamy | G06Q 20/3674 |
| 2019/0334719 | A1* | 10/2019 | Naqvi | H04L 9/50 |
| 2019/0362826 | A1* | 11/2019 | Viskovich | G16H 20/40 |
| 2020/0059352 | A1* | 2/2020 | Walling | G06F 21/64 |
| 2020/0074437 | A1* | 3/2020 | Bonsi | G06Q 20/3278 |
| 2020/0090463 | A1* | 3/2020 | Mohrhardt | G07F 17/3244 |
| 2020/0118068 | A1* | 4/2020 | Turetsky | G06Q 20/06 |
| 2020/0118131 | A1* | 4/2020 | Diriye | G06Q 20/4016 |
| 2020/0133658 | A1* | 4/2020 | Agrawal | G06F 8/70 |
| 2020/0143352 | A1* | 5/2020 | Taylor | G06Q 30/08 |
| 2020/0193417 | A1* | 6/2020 | Dao | G06Q 20/36 |
| 2020/0227178 | A1* | 7/2020 | Lombardi | G06N 20/00 |
| 2020/0280444 | A1* | 9/2020 | Tang | G06F 21/31 |
| 2021/0020317 | A1* | 1/2021 | Lillaney | G16H 70/40 |
| 2021/0064780 | A1* | 3/2021 | Riedel | G06Q 30/0185 |
| 2021/0067201 | A1* | 3/2021 | Wang | H04W 4/80 |

OTHER PUBLICATIONS

"Blockchain-based Payment Collection Supervision System using Pervasive Bitcoin Digital Wallet"; Po-Wei Chen, Bo-Sian Jiang, Chia-Hui Wang; Fifth International Workshop on Pervasive and Context-Aware Middleware 2017 (Year: 2017).*

"A Decentralized Marketplace Application on The Ethereum Blockchain"; R. Vishnu Prasad, Ram Dantu, Aditya Paul, Paula Mears; 2018 IEEE 4th International Conference on Collaboration and Internet Computing (Year: 2018).*

"A Blockchain-Based Micro Economy Platform for Distributed Infrastructure Initiatives"; Jan Kramer, Jan Martijn E. M. van der Werf, Johan Stokking, and Marcela Ruiz; 2018 IEEE International Conference on Software Architecture (Year: 2018).*

* cited by examiner

FIG. 1

Central Application
101

Token Wallet
210

User Profile and Preferences
220

Secure Device Data Storage
230

Central SDK
240

FIG. 2

Developer Application
105

Application Features
310

Application Content
320

Central SDK
240

FIG. 3

Additional System Components 103

| Central Organization 410 | Marketplace 420 | Data Exchange 430 |

| Crypto Enabled Systems 440 | | Legacy Systems 450 |

| Token Exchange 460 |

HYBRID ORGANIZATIONAL SYSTEM FOR DATA MANAGEMENT AND TRACKING

BACKGROUND

Today, many large technology companies make large profits from data collected from their users. These companies often take data from customers unwittingly, giving users little insight into what data is used and how the users may opt in or opt out of sharing particular data items. In addition, different brands maintain their respective presences using services from these large companies, in order to be able to better target current and potential customers. Such brands often use these data-collecting companies as middlemen, and may lack specific insights regarding how to better target their userbases.

In recent times, blockchain has been leveraged to do analysis of massive data sets, while preserving privacy for owners of the data, or users. However, the decentralized nature of blockchain systems may make data management, and analysis thereof, more difficult.

SUMMARY

Recognized herein is a need for a system that provides users, application developers, and companies better control with respect to the data shared and the data collected. Described in this disclosure is a system that uses a hybrid centralized-decentralized architecture. The system combines a central application, controlled by a central organization, with a decentralized blockchain architecture to facilitate data exchange between different actors (e.g., users, application developers, companies). The central organization thus handles onboarding of users, streamlines data collection from user accounts, and organization and enrichment of data into actionable packages for use by companies.

In one aspect, a system is disclosed. The system comprises a developer application, configured to request one or more predetermined types of data from a plurality of contributors. The system includes a central application, configured to: (i) maintain, for a contributor, a contributor profile comprising one or more contributor profile characteristics, (ii) enable the contributor to select and deselect a combination of the one or more contributor profile characteristics, and (iii) securely transfer contributor data. The contributor data is determined based on the one or more contributor profile characteristics. The system also includes one or more additional system components, configured to perform one or more operations on the contributor data, and perform token transactions with one or more contributors.

In some embodiments, the contributor profile characteristics are selected from a group consisting of gender, age, ethnicity, location, physical address, occupation, marital status, education, number of children, income, hobbies, interests, favorite brands, and favorite websites.

In some embodiments, the central application is configured to access data stored on one or more social networks and extract content from the one or more social networks.

In some embodiments, the developer application is associated with a company. The company includes one or more brands.

In some embodiments, the developer application enables the contributor to interact with content. The content comprises games, videos, and surveys.

In some embodiments, the developer application enables the contributor to perform token transactions.

In some embodiments, the developer application passively collects transaction data from the contributor.

In some embodiments, the developer application requests data from the contributor.

In some embodiments, the developer application requests the data periodically.

In some embodiments, the central application includes a token wallet.

In some embodiments, the token wallet enables the contributor to perform one or more activities selected from the group consisting of: input and manage personal data, purchase intent, purchase history, or other profile data, link social media or other online accounts to propagate data on the data exchange, register a smart contract address linked to the token wallet, view a balance of the token wallet, receive payments, view one or more applications linked to the contributor's SSI (self-sovereign identity), backup or export wallet data or keys, recover a user's identity or personal information, and interact with one or more marketplaces.

In some embodiments, the contributor profile is integrated within a self-sovereign identity framework.

In one aspect, a system is disclosed. The system comprises a developer application, configured to request one or more predetermined types of data from contributors. The system includes a central application, configured to: (i) maintain, for a contributor, a contributor profile comprising one or more contributor profile characteristics, (ii) enable the contributor to select and deselect a combination of the one or more contributor profile characteristics, and (iii) securely transfer contributor data. The system also includes one or more additional system components, configured to perform one or more operations on the contributor data, and perform token transactions with one or more contributors. The system components comprise a data exchange system storing segmented and aggregated user data in a taxonomy. The data is from a plurality of contributors, including the contributor.

In some embodiments, the data exchange system provides the segmented and aggregated data to a company associated with the developer application.

In some embodiments, the data exchange system performs data refresh, data pricing, token reserve, settlement, payouts, transaction batching, and fraud prevention.

In some embodiments, the taxonomy comprises data entities and relationships between the data entities.

In some embodiments, the data entities are selected from the group consisting of actions, brands, categories of mobile devices based on application usage patterns, households, media content items, media channels, mobile applications, organizations, locations, persons, residences, venues, Wi-Fi access points, and zones.

In some embodiments, the relationships are selected from the group consisting of a mobile device belonging to a demographic, an action associated with a mobile device, application, or organization, a mobile device connected to a Wi-Fi access point, a linking of coordinates to municipal locations, a source for a media file, a group a user belongs to, a device an application is installed on, a location of a mobile device, a location of a user, a device owned by a user, and a use of a mobile device within a particular venue.

In some embodiments, the data exchange system is configured to incorporate developer applications when developers of the developer applications apply to be part of the data exchange system.

In another aspect, a computer-implemented method of secure information exchange is disclosed. The method comprises obtaining data items from at least one data contributor from one or both of a central application and a developer application. The method further comprises using a distributed network of databases, transmitting one or more of the data items to one or more a system component. The one or more data items are specifically selected by the at least one data contributor. The method further comprises using the distributed network of databases, issuing one or more tokens to the data contributor.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Blockchain System

Provided herein is a hybrid organizational blockchain-powered data management and tracking system which uses a centralized data exchange system and central application to securely transfer and manage data and tokens across a wide variety of decentralized system components. The disclosed system may comprise, and/or be used by, various stakeholders. Stakeholders may include users and companies (which may include or be associated with one or more brands), who may own or control system components, such as applications and a data exchange. The users, also referred to herein as "data contributors," provide data into the system, which data is collected and processed by applications developed by application developers. An application may be associated with a brand (or a company), which may benefit from the collected user data, such as gain of actionable insights that enable it to better target its user bases. The additional components can facilitate backend operations for the system, including data privacy, data security, storage of information and of tokens, and data transfer.

A data contributor, or user, may use an application (e.g., mobile application, non-mobile application, etc.) on a user device (e.g., mobile phone, computer, tablet, etc.) to customize data sharing preferences at a high level of granularity. For example, a user may toggle whether to share specific demographic items, such as age, ethnicity, gender, and education, and other user data items, such as user device usage (e.g., frequency of usage, hours logged, etc.) and application usage (e.g., frequency of usage, pages visited, user social interactions within the application, etc.), with various stakeholders or system components, and specify which stakeholders or system components have access to specific data items. In return for sharing these data items, the user may receive secure tokens from one or more stakeholders. Alternatively or in addition, in return for a shared data item being used (as opposed to just being collected), the user may receive secure tokens. In some instances, the usage of user data may be tracked, and the user compensated with secure tokens based on the tracked usage (e.g., frequency of data use, importance of data use, etc.). The tokens may be used as financial credit or non-financial credit. For example, the tokens may be used to purchase goods and services from the additional stakeholders within the system, or provided as gifts to other individual stakeholders within the system.

An application developer can develop an application that collects data from users. An application may be associated with a company. For example, the company may own the application. The company may own or be associated with one or more brands, which may have separate applications, or which may be represented within a common application, which is associated with the company. Data from users may be used (e.g., analyzed) by the company, for example, to sell (or not sell) these users its goods and services. Applications may be designed to passively or actively collect data from users, including demographic data and user engagement data. In some instances, user engagement data may comprise data relating to user engagement with the developer's brand, user engagement with similar brands, or statistics relating to general user device usage (e.g., device usage).

One or more system components can facilitate the flow of data and tokens through the system, such as by providing goods and services, managing and transferring data between stakeholders, issuing rewards, and performing various other activities. The system components may ensure that data is verified, authenticated, and maintained securely, and that it is distributed to proper recipients. The system components may ensure that certain stakeholders receive appropriate token disbursements in exchange for data, and use thereof. The system components may use resources which may comprise cloud services, and these resources may be maintained within one or more servers. The server may or may not be co-located. These services may provide storage, data processing, and/or data management functions.

The system components may include a data exchange system, which may perform much of the preparation, management, consolidation, and distribution of data flowing through the system. The data exchange system may receive data from users, such as user profile data, and/or from applications, such as application data and user data collected from the users, and may organize the data by determining relationships between data items. The data items may be segmented by user, demographic of user, location, or other categories, enriched, packaged, and distributed to companies in particular formats. The companies may then use the packaged data to determine better targeting practices for their audiences (e.g., users or groups of users).

Secure data exchange is made more efficient by using a self-sovereign identity (SSI) framework, where secure messages may be exchanged using decentralized cryptography methods. Users of the system may store public keys and credentials on a public blockchain, and entities wishing to send secure messages to the users may retrieve the users' public keys from the blockchain, encrypt messages, and direct the messages to the users' wallet addresses listed on the blockchain. Users can verify the senders of the messages by retrieving sender information from the public blockchain. This prevents stakeholders from having to provide their public keys to other stakeholders, and reduces risks of messages being forged by attackers. Messages sent from a sender stakeholder to a recipient stakeholder (such as the data exchange) may be signed with the sender's private key, in order for the receiver to validate that the messages were sent by the sender alone and not by another entity.

The system may be managed by a central organization, which provides a software development kit (SDK) to users and application developers to onboard both groups into the system, manage data and token transactions, and link user accounts across many applications.

In some embodiments, stakeholders may transfer secure tokens to one another in exchange for data or data processing activities. In other embodiments, the stakeholders may disburse other types of rewards, including incentive points. In these embodiments, stakeholders also determine wallet addresses through the public blockchain.

Figure 1:
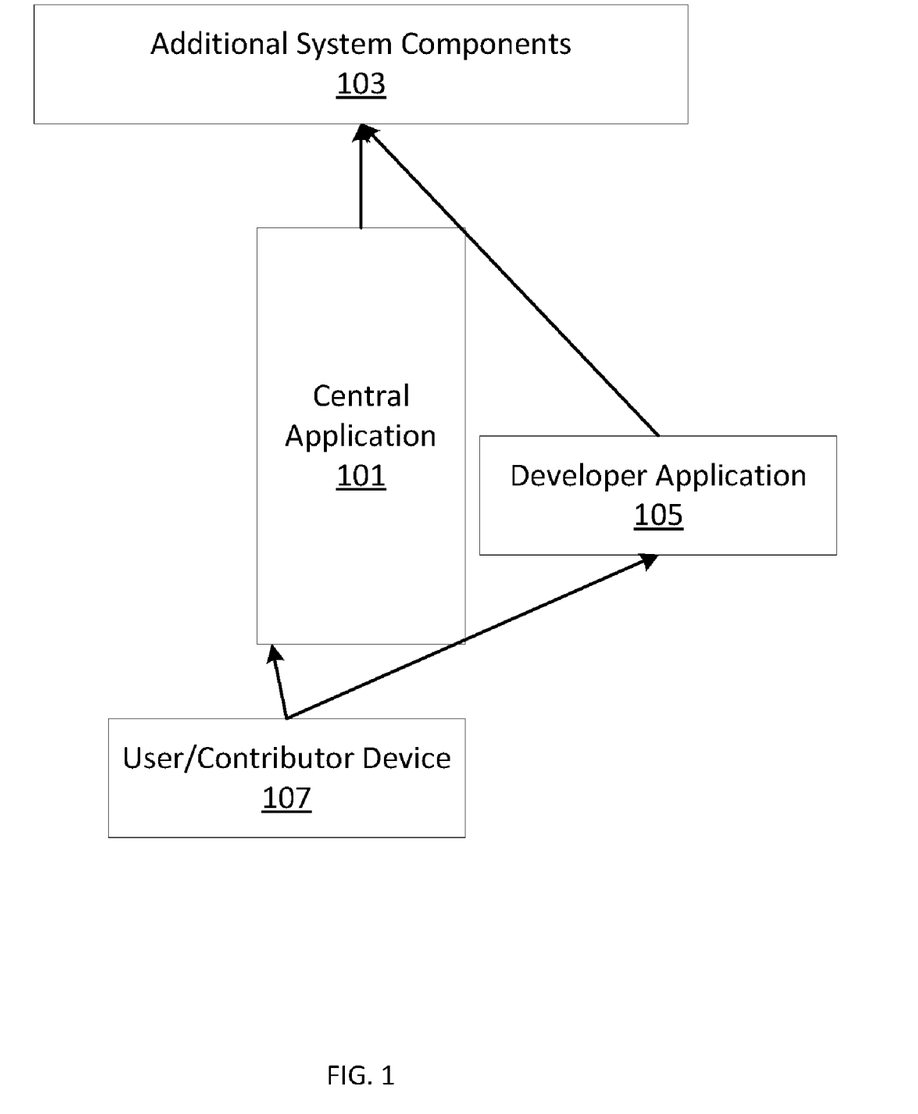
FIG. 1 shows a system diagram for a blockchain-powered, partially centralized, data exchange system.

FIG. 1 shows a system diagram for a blockchain-powered, partially centralized, data exchange system. FIG. 1 shows a data contributor, or user, mobile device 107 accessing a central application 101 and a developer application 105, both of which in turn communicate with additional system components 103.

The user device 107 may be any network-connected computing device, capable of storing user data and executing applications. The user device 107 may have one or more application developer applications installed on it, which facilitate user interactions with content provided by the applications.

The user device 107 may be a mobile device, such as a cellular phone, a smartphone, a tablet computer, a laptop computer, or a desktop computer. The user device 107 may be handheld. The user device may be a wearable device. The user device may be a non-mobile device. A user device can also include any other media content player, for example, a set-top box, a television set, a video game system, a virtual reality system, or any electronic device capable of providing or rendering data. The user device 107 may be connected to an internet network, a local area network (LAN), a wide-area network (WAN) such as the Internet, a telecommunications network, a data network, or another type of network. The user device 107 may be connected to the network via wired or wireless communication methods.

A user device 107 may comprise memory storage units which may comprise non-transitory computer readable medium comprising code, logic, or instructions for performing one or more steps. A user device may also comprise one or more processors capable of executing one or more steps, for instance in accordance with the non-transitory computer readable media. The user device 107 may comprise a display showing a graphical user interface (GUI). The user device 107 may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. For example, a user may input data into the data exchange system or to one or more applications, or otherwise create data by interacting with or navigating the one or more applications, via one or more user interactive devices. The user device 107 may be capable of executing software or applications provided by one or more systems, such as a central application and one or more developer applications, as described herein.

The user device 107 may comprise one or more sensors. For example, a user device may comprise one or more geo-location sensors that may be useful for detecting the location of the user device. For example, the geo-location sensors may use triangulation methods or global positioning systems (GPS) to aid in determining a location of the computing device. A user device may comprise an image capture device or other optical sensor (e.g., camera) and be capable of capturing an image. For example, a camera can be integrated in the user device. The camera can be an external device to the user device and communicate via wired (e.g., cable) or wireless (e.g., Bluetooth, Wi-Fi, NFC, etc.) connection. The image capture device may be useful for capturing an image of the user or any other object within the user's environment. A user device may comprise an audio sensor (e.g., microphone), force sensor (e.g., pressure sensor), biometric sensor (e.g., fingerprint, pulse, etc.), or any other type of sensors. The one or more sensors may be integrated with the user device. The one or more sensors may be external to and in operative communication with the user device. The one or more sensors may be used to generate data of the user. In some instances, the user device may receive or access one or more data items that are created or captured by an external device, and/or a separate storage space, including a database of a server or a cloud storage space.

The central application 101, installed on users' devices, allows users to control their data sharing preferences, receive tokens, and perform transactions using the received tokens. The central application 101 may be owned and controlled by a central organization. The central application 101 may include a user interface that allows users to change user profile information, which may be stored on the device itself or on another network-connected device. The user profile information may include personal demographic information, such as gender, age, ethnicity, location, physical address, occupation, marital status, education, number of children, and income. Users may be able to select desired attributes which signal targeting criteria for companies, including hobbies, interests, favorite brands, or favorite websites. The central application 101 may be able to access data stored on one or more social networks, and extract connections from these social networks, or access user posts or shared content, such as to gather user profile information.

Users may be able to use authentication protocols, such as open authentication (OAuth), to log into the central application through social networks or websites and allow the central application to extract this data. Users may also be able to share information obtained via email or online communication. The central application may also have a system by which users may be able to perform token transactions. Tokens may be used to procure goods and services, as well as be transferred to other connected users.

The developer application 105 may be an application developed by software engineers on behalf of a company, such as a retail company. A developer application 105 may or may not be a brand-specific application. The developer application 105 may contain a storefront, which may allow users to browse items and may allow the users to input token payments. The application may include other content with which the user may engage, such as games, videos, or surveys. The application may provide users with notifications, such as email or pop-up notifications, informing the users of promotional offers or new on-sale items. The developer application 105 may passively or actively collect data from the user. The collected data may include application usage statistics, such as time spent with the application opened, time spent browsing specific pages or entries, items purchased within a time period, items searched, items clicked within a time period, content mentions or sharing from the application on social networks or messaging programs, invitations sent to connections, and other usage data. The collected data may also include responses to survey questions presented in popup notifications, user rating information, interaction data from gameplay, total number of purchases made, average spend on purchases, and whether the user purchases with tokens or with other methods.

Application developers may request specific data from the user periodically, or may request the data after one or more transactions have been made. For example, data may be requested periodically every minute, every 2 minutes, every 3 minutes, every 4 minutes, every 5 minutes, every 6 minutes, every 7 minutes, every 8 minutes, every 9 minutes, every 10 minutes, every 20 minutes, every 30 minutes, every 40 minutes, every 50 minutes, every hour, every 2 hours, every 3 hours, every 4 hours, every 5 hours, every 6 hours, every 7 hours, every 8 hours, every 9 hours, every 10 hours, every 11 hours, every 12 hours, every 13 hours, every 14 hours, every 15 hours, every 16 hours, every 17 hours, every 18 hours, every 19 hours, every 20 hours, every 21 hours, every 22 hours, every 23 hours, every day, every 2 days, every 3 days, every 4 days, every 5 days, every 6 days, every week, every 2 weeks, every 3 weeks, every 4 weeks, every month, every 2 months, every 3 months, every 4 months, every 5 months, every 6 months, every year, every 2 years, and etc. Alternatively or in addition, data may be requested irregularly. Alternatively or in addition, a user may select to manually provide data, in response to a request for data. Alternatively or in addition, a user may select to manually provide data regardless of a request for data.

The system may be configured to maintain a percentage of token disbursements to application developers and users. For example, the system may be configured to compensate both groups with 50% of token disbursements, to fairly reflect the users' sharing of profile data and the application developers' extraction of interaction data requested by companies. In various embodiments, token disbursement percentages may be calibrated in order to fulfil engagement targets by either application developers or users. For example, if the central organization desires to increase user engagement, token issuances to users may be larger.

The additional system components 103 may facilitate exchange of data and tokens or may use data collected from the user through the developer application. For example, a data exchange may receive data from a user device, from the central application and the developer application, and provide the data to stakeholders, such as brand entities or marketplaces. The stakeholders may provide the goods and services purchased by the user through the developer application. Stakeholders may include crypto enabled systems, such as enterprise technology systems, that provide direct incentives to users through the developer applications. Brands may also host marketplaces from which users may buy goods.

Figure 2:
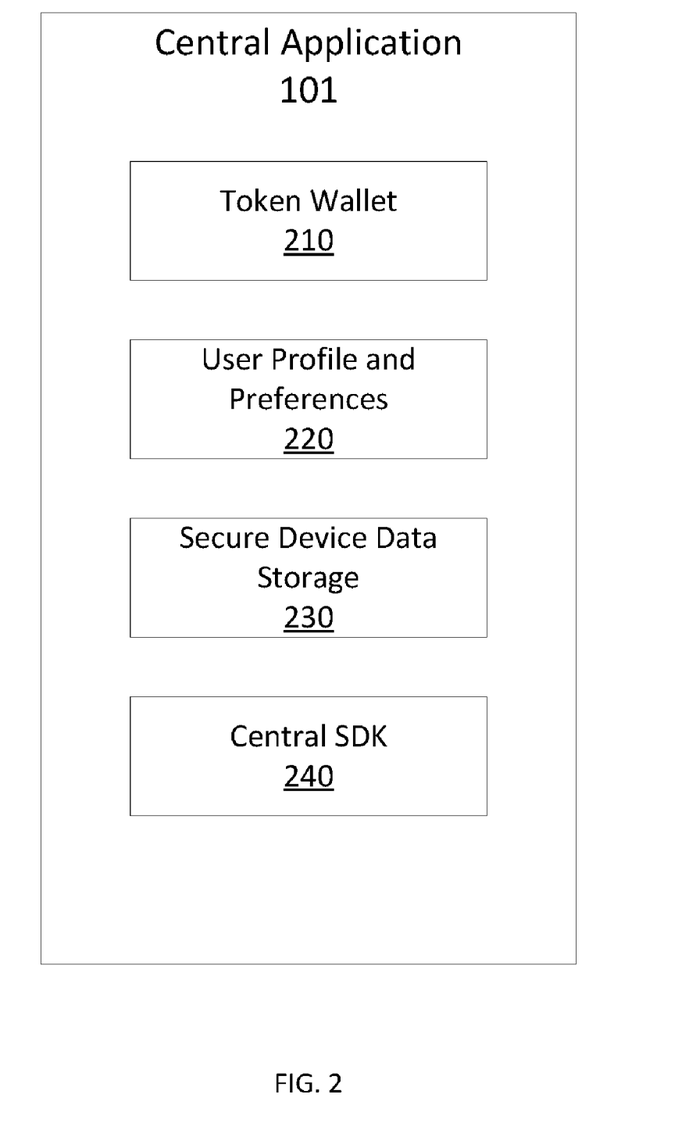
FIG. 2 illustrates a block diagram of the central application.

FIG. 2 illustrates a block diagram of the central application 101. The block diagram includes a token wallet 210, a user profile 220, secure data storage 230, and a central application software development kit (SDK) 240.

The token wallet 210 allows tokens to be deposited into a user's account. The token wallet may have a unique address, and entities sending tokens to the user may retrieve the wallet address prior to sending one or more tokens. The token wallet 210 may maintain a transaction history, showing a record of transactions between the user and other users or entities. The token wallet 210 may enable the user to enter and manage personal data, purchase intent, purchase history, or other profile data, link social media or other online accounts to propagate data on the data exchange, register a smart contract address linked to the wallet, view balance, receive payments, view applications linked to the user's SSI (self-sovereign identity), backup or export wallet data or keys, recover a user's identity or personal information, and interact with one or more marketplaces. A user's wallet address may be determined from the public ledger of the blockchain. Tokens may be transferred between wallets using address translation.

In some embodiments, tokens may be transferred using smart contracts. Using a smart contract, one stakeholder may agree to distribute tokens to a requesting stakeholder when particular conditions are met. This agreement is placed on the blockchain. When the condition-meeting stakeholder has met the conditions, such as sending a particular data item or engaging with a particular piece of content, the smart contract may be executed and tokens sent from the requesting stakeholder to the condition-meeting stakeholder.

The user profile 220 maintains information about the user of the system. The user profile may maintain demographic information, such as name, age, gender, marital status, location, salary, and education. Users may select particular data items to mark as public or private. The user profile may also contain information to help companies target users, such as hobbies, favorite brands, favorite stores, interests, and wishlists. Users may also select specific groups of data to share with some stakeholders, but restrict to others. They may also select specific combinations of data to share, but restrict access to one or more standalone data elements within that group. For example a user may have data elements A, B, C, and D within his or her profile, and may only elect to share data element A if it is shared in a particular combination consisting only of B and D.

The user profile 220 may be integrated within a self-sovereign identity (SSI) solution that allows a user to unify interactions across multiple applications and devices. Such an identity solution may bring together, in a decentralized ledger, interactions the user has with all of the applications the user uses. The SSI framework may connect all of the stakeholders in the system. SSI allows users to store digital identifiers on a public blockchain ledger. When stakeholders exchange encrypted messages to one another, they can check the digital identifiers from the blockchain ledger in order to verify the identities of the original senders of the encrypted messages. This eliminates the need for the parties to send each other their public keys, or verify identities by using digitally signed certificates.

The secure device data storage 230 allows personal data to be maintained in a manner that reduces the risk of theft or compromise. The user may be required to submit credentials, such as a username, a password, and a security question answer, in order to access or modify personal data. Data may be stored within physical memory on the device, such as RAM memory. Sensitive data may be encrypted using third-party encryption, such as SQLCipher. Data on devices may also be encrypted using advanced encryption standard (AES). Transactions between a client device and a storage device, as well as other system components, may use a shared public-private key pair based on a 24-word phrase. This mechanism may authenticate a user of the client device and ensure that the user is in custody of the data when the system components interact with it via SSI or APIs.

The central software development kit (SDK) 240 may be used to facilitate onboarding of new users and send data generated from the users to the data exchange. Users may be able to link their identities across multiple developer applications using SSI, integrated into the SDK 240. For example, the users may be able to upload their public keys to the blockchain through the SDK 240. For a single user with different identities on multiple applications, the SDK 240 may link the different identities to a single public-private key pair. The SDK 240 may then allow users to select particular addresses of other stakeholders to send data, download the other stakeholders' public keys, encrypt and package the data, and transfer it to the other stakeholders. The SDK 240 may also receive tokens or data from other users. The SDK 240 may allow users to import both identities and data from various developer applications, either automatically or manually, and compile the data into a standardized format used by the central application. The SDK 240 may allow application developers to register particular areas of their applications that end users interact with, and send that interaction data into the data exchange. For example, application developers may be interested in views of a particular page. The developers may register that all interactions with particular pages by a user be automatically uploaded to the data exchange.

Identity management may also be performed using a client-server model instead of a blockchain model. When the SDK 240 is installed in a device, it may generate a session key and public-private key pair. These may be used to register the device in order for other stakeholders to verify the SDK corresponds to the device. The session key may be held by the app developer and the central application. A user may generate a token wallet from the SDK 240 and may generate his or her own public-private key pair.

Figure 3:
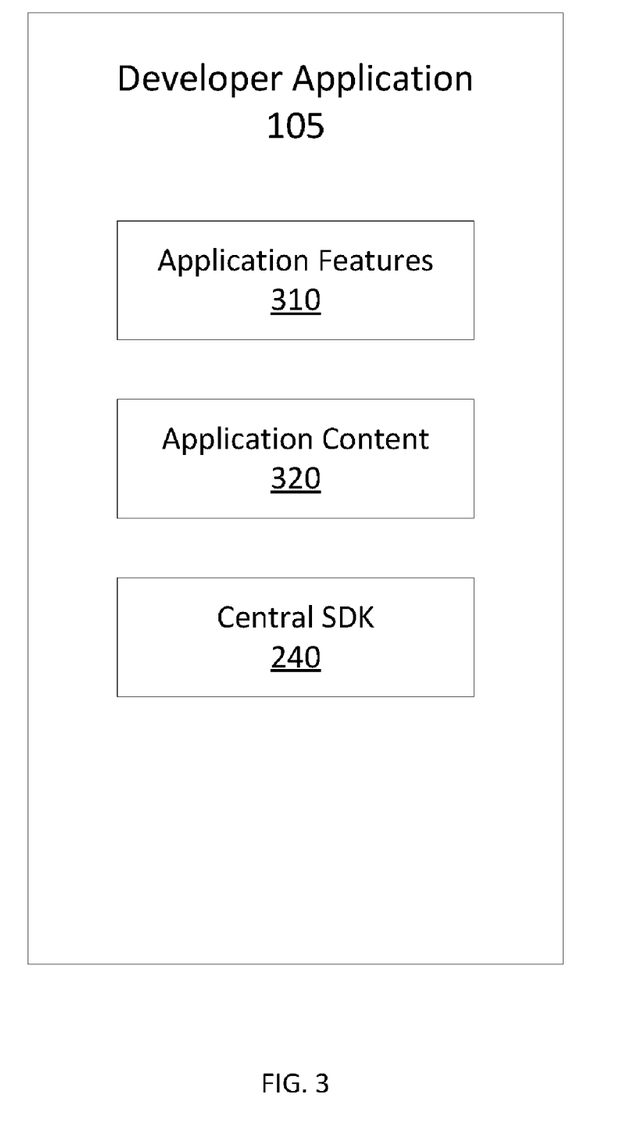
FIG. 3 shows a developer application accessible from a user device.

FIG. 3 shows a developer application accessible from a user device. The developer application includes application features, application content, and the central software development kit (SDK).

Application features 310 include types of interactions users are able to perform and may create interaction data that is provided to the data exchange. Features may include surveys, games, clickable pages, stores, chat programs, message boards, and news feeds. Users may interact with the features by clicking links, viewing pages, posting text or multimedia content, playing games, messaging other users, and uploading files or documents.

Application content 320 is media presented within the developer application with which users interact. Application content 320 may include audio or visual media, such as photos, videos, or music. Application content 320 may also be able to be manipulated by users, such as interactive objects that respond to gestures. For example, application content 320 may include user interface elements that are hand-controllable, such as pages or clickable buttons. Interactions with specific content items may be logged by the application and sent to the data exchange, where the interactions may be packaged for analysis and sent to other stakeholders.

The developer application 105 may also be able to interface with the central SDK, in order to transmit application activity data to the data exchange. The developer of the application may apply for the application to be part of the data exchange. The application may be classified and validated in order to categorize the data the application sends to the exchange. The application may maintain a persistent link to the data exchange in order to automatically send triggered data when particular events occur. For example, every time a particular page is accessed by a user, the application may send a record of the page access, including a timestamp and user identifier, to the data exchange. The user may also have control over the data the application sends to the data exchange. Within the developer application 105, the user may be able to enable or disable automatic data delivery to the data exchange, and may be able to opt in or opt out of sharing one or more particular data items. The SDK 240 may also be able to link user data within the developer application to the user's profile within the central application.

The developer programming or owning the application may also have a token wallet, which functions similarly to the user token wallet.

Figure 4:
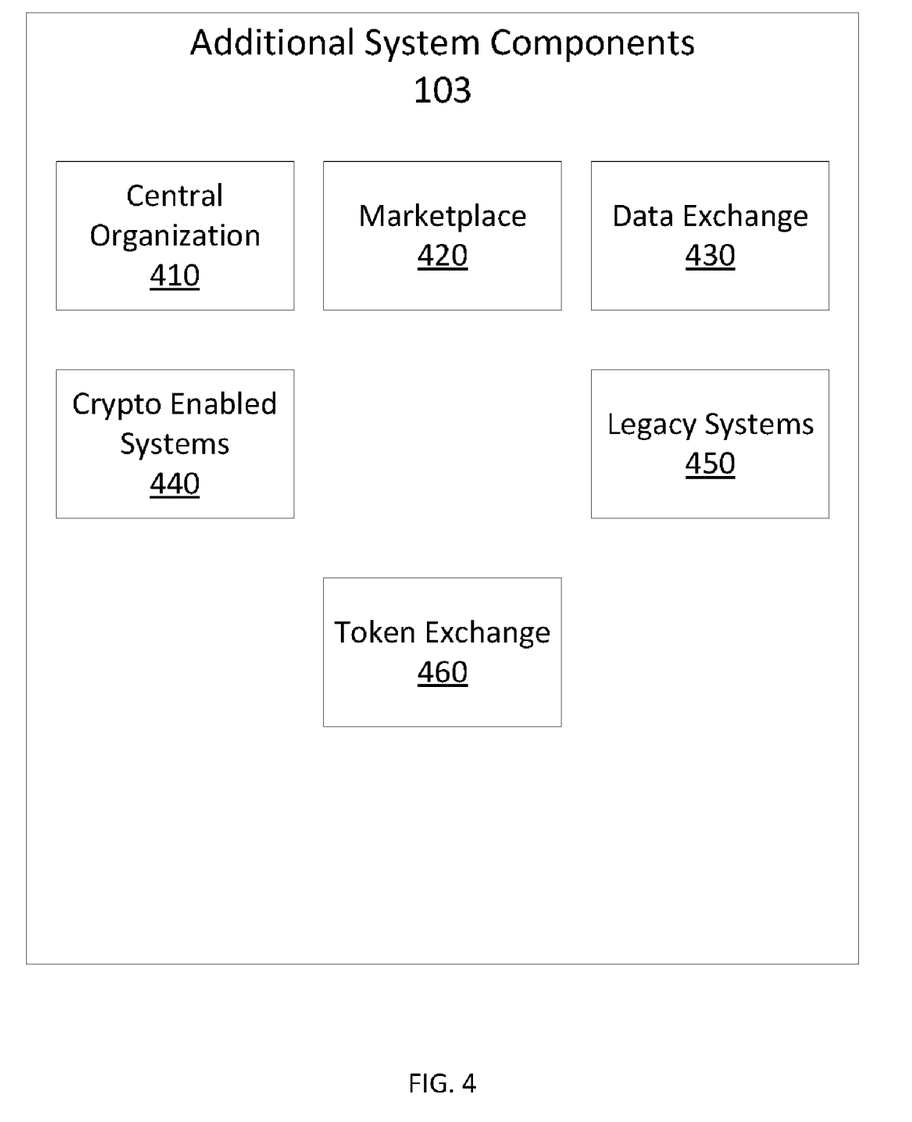
FIG. 4 illustrates a block diagram of the additional components.

FIG. 4 illustrates a block diagram of the additional system components. The additional system components include a data exchange 430, a central organization 410, a marketplace 420, crypto enabled systems 440, legacy systems 450, and a token exchange system 460.

The data exchange 430 serves as a *nexus* point for all of the system's stakeholders. The data exchange 430 is the means by which the data from users is organized, captured, and prepared for other system components. In addition, data captured from various system components, including the central application 101 and the developer application 105, may be enriched by the data exchange 430. The data exchange 430 may use a deterministic data set, derived from data from actual interactions of users with online content. The data exchange 430 aggregates and processes data to form a data taxonomy, which may be enriched and provided to stakeholders in a customized report. The data exchange 430 may also ensure system functionality including data refresh, data pricing, token reserve, settlement, payouts, transaction batching, and fraud prevention. Transaction batching may be consolidating multiple transactions from a user within a time period into a summary transaction. For example, transaction batching may include batching five impressions for one user in a day. Transaction batching may be performed in order to speed up data processing, reduce transaction costs, and provide a better user experience. Fraud prevention may involve licensing $3^{rd}$ party software which creates a blacklist of $3^{rd}$ party devices to exclude from participating in one or more types of transactions. Creating the deterministic data set and taxonomy allows stakeholders to receive validated, organized data that fulfills their particular needs.

The data exchange's data taxonomy may comprise data entities and relationships between them. Entities may include actions, brands, categories of devices based on application usage patterns (such as coffee lover or car owner), households, media content items, media channels, mobile applications, organizations, locations, persons (\device owners), residences, venues, Wi-Fi access points, and zones. Entities may be connected to one another by one or more types of relations. These relations may include a device belonging to a demographic, an action associated with a device, application, or organization, a device connected to a Wi-Fi access point, a linking of coordinates to municipal locations, a source for a media file, a group a user belongs to, a device an application is installed on, a location of a device, a location of a user, a device owned by a user, and a use of a device within a particular venue. These relations may be used in conjunction with the data entities to create a categorical graph, or taxonomy. For example, a set of entities and relations may comprise a "Life Stage" taxonomy, when all of them relate to life stages such as childhood and marriage. An "interest" taxonomy may include all entities and relations reflecting a hobby or interest of a particular user.

The data exchange 430 may incorporate application developers into the system when they apply to be part of the data exchange. This may be done using a discovery API. The data exchange may specify criteria for applications to be able to interface. For example, the application may need to follow specific security protocols with respect to handling data from users. The data exchange 430, once an application is authorized to be part of the system, may classify the application. For example, the data exchange 430 may classify an application as a streaming service, a social network, or a game. The data exchange 430 may perform a validation to ensure that the application is the type of application the developers advertise it to be. This validity check may be performed using an automated test, or manually by a human. The data exchange 430 may then extract the application activity data and determine where the data fits into the data taxonomy. The extracted events may be validated before being placed in the taxonomy. In some embodiments, a human may classify the events. In other embodiments, event classification may be performed using a classification algorithm, such as a machine learning algorithm or statistical method. In other embodiments, classification may be automated using a set of rules, a statistical analysis method, or a machine learning algorithm. For example, the data exchange 430 may maintain a set of sources that have rules for assigning applications into categories. The data exchange 430 may be able to download additional references in order to be able to better assign applications into categories. Classification may be performed using similarity (Jaccard, overlap, cosine), path finding (shortest path), centrality (page rank, article rank, betweenness, closeness, harmonic), and community detection algorithms.

The data exchange 430 may additionally be able to categorize different devices, based on the applications installed on the devices. This may be performed by using algorithms to read application descriptions on application stores, or by using document similarity methods. Information taken from user reviews, age ratings, listed categories, and publisher names may also be analyzed.

The data exchange 430 may be able to verify claims. For example, a user may be issued a credential by a third party application. The user may be able to register this credential to the blockchain address containing the user's public key and other public information. The data exchange 430 may view the user's blockchain record to verify that the user, in fact, holds the credential.

The data exchange 430 may be able to provide stakeholders with use of its analysis tools or copies of data from the data exchange 430, in order for the stakeholders to perform independent analysis on the organized or enriched data. Terms for sharing analysis tools and data may be executed using smart contracts. Brands may also be able to license user profile or application usage data directly using the data exchange. Users and application developers may be compensated, using smart contracts, per use of their data. Although both users and application developers may receive compensation for both user profile and application usage data, users may receive larger proportions of payments for user profile data and application developers may receive larger proportions of payments from application usage data.

The central organization 410 produces the central application 101 downloaded onto the user's device. The central organization 410 manages token transactions, manages the data exchange, and manages the marketplace. In order to entice users to begin using the platform, the central organization 410 may provide one or more series of token transfers when users are onboarded into the system. The central organization 410 may also perform token transfers to companies in order to entice these companies to participate in the system, and engage with onboarded users.

The central organization 410 may determine data pricing, and manage specific token payment amounts for users who provide particular data items or particular amounts of data items. The central organization may reconcile usage of a particular device's data over a period of time (e.g., a day, a week, or a month), and settle token disbursement amounts to users. The token exchange may allow application developers to exchange tokens with companies. Users may be compensated with amounts that are based on rules. For example, users sharing data which is classified as more valuable or more actionable by certain companies, such as purchase histories, spending amounts, or products users are interested in, may be valued more and greater numbers of tokens may be issued to users as a result of higher valuations. In another example, users may be issued more tokens when they contribute more data into the system. Rules for data pricing may be changed manually, by members of the organization, or may be determined algorithmically. For example, data may be collected on token payments users may accept for various data items, and disbursements may be adjusted algorithmically to reflect the collected data. Gender and location data may be among the types of data most valuable to companies. In some embodiments, data pricing may be performed using optimized pricing algorithms, such as machine learning and deep learning algorithms.

The token exchange 460 may be a third-party system that allows stakeholders to procure and disburse tokens. The token exchange 460 may be integrated into a user interface for the central application in order to make it easy for users to register for it. The token exchange may enable fiat-to token (e.g., cryptocurrency token) conversion or token-to-token conversion.

Legacy systems 450 are systems companies currently use to market and promote their products and services. These services may include automated marketing services, online advertising services, and demand generation services. Legacy systems 450 may be systems that do not accept token payments, and may be compensated for their services using fiat currency.

Crypto enabled systems 440 are systems companies may use to market and promote their products that are capable of handling token payments. For example, companies may request marketing automation or online advertising services from one or more crypto-enabled services, and compensate the owners of the services using tokens. The crypto enabled systems may also be able to provide users with direct incentives on behalf of the companies, through the users' central applications. For example, a brand may use a marketing automation company to entice a user to share particular data items. When the marketing automation company has been notified that the user has shared the requested items, the marketing automation company may place tokens in the user's token wallet. The payment may be performed using an escrow digital wallet. Payments from this wallet may be triggered, for example, when users interact with applications or enter locations. The crypto enabled systems may also provide data to the data exchange, for enrichment. This data may include effectiveness data for marketing campaigns or records of user actions in response to marketing or advertisements.

The marketplace 420 allows users to purchase goods and services from companies. The users may purchase goods using tokens, and may be delivered the goods through the marketplace. The marketplace 420 may transfer the token payments directly from the company, and receive digital goods in return from the company. The marketplace may also provide users with offers and rewards. Rewards may include gift cards, simple auctions, and specialized offers. Offers may change seasonally, or be added as new companies are added to the system. The central application 101 may display a graphical user interface to allow users to view offers presented by the marketplace. The marketplace 420 may have a demand side platform, allowing companies to manage multiple advertising exchange and data accounts through a single interface.

Figure 5:
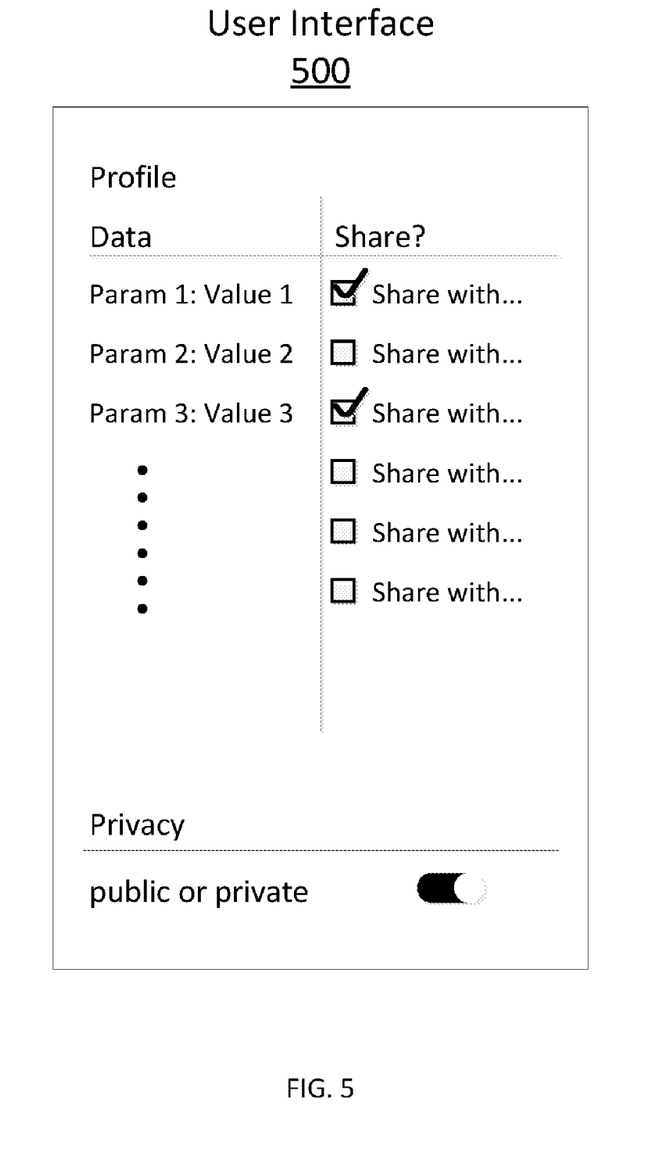
FIG. 5 shows an example of a user interface for the central application.

FIG. 5 shows an example of a user interface 500 for the central application. The user interface shows a user profile, which comprises data parameters and associated values. There is a privacy menu that allows the user to turn sharing on for all of the parameters. Alternatively, the user may individually select or deselect individual items to mark public or private.

Computer System

Figure 6:
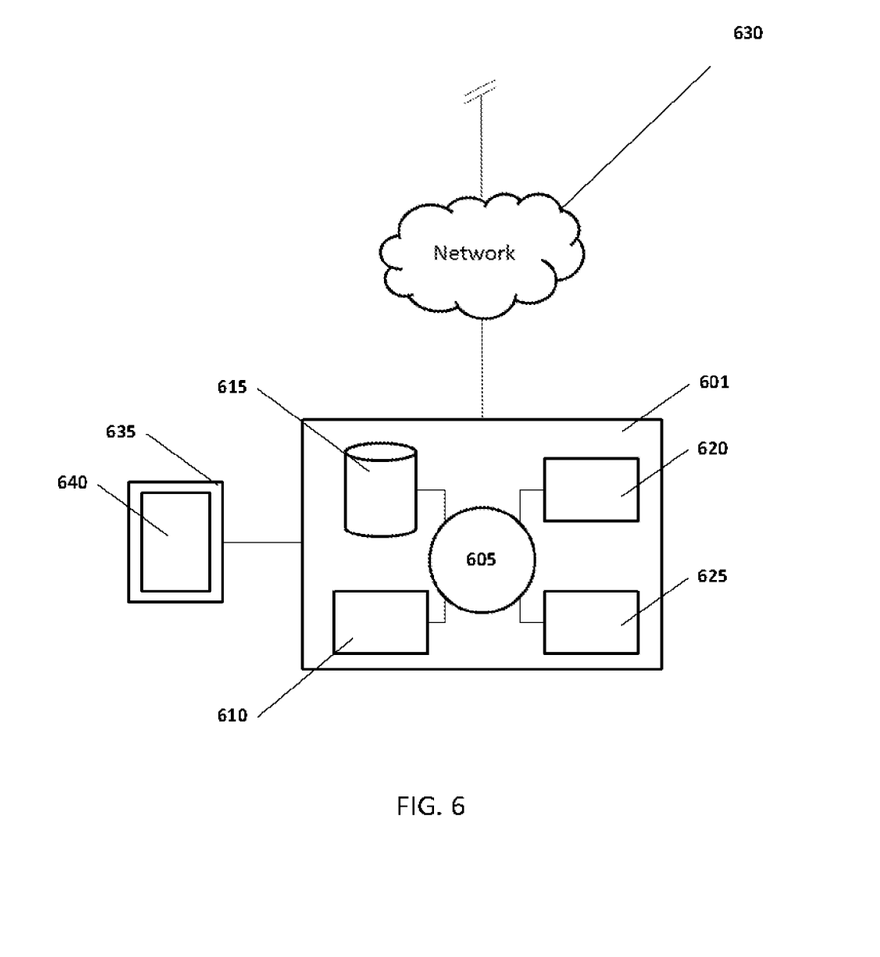
FIG. 6 shows a computer system that is programmed or otherwise configured to perform data sharing and analysis tasks.

The present disclosure provides computer systems that are programmed to implement methods of the disclosure. FIG. 6 shows a computer system 601 that is programmed or otherwise configured to perform data sharing and analysis tasks. The computer system 601 can regulate various aspects of the present disclosure, such as, for example, storing actions from users and stakeholders, transferring data and tokens, and performing analysis. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet or extranet, or an intranet or extranet that is in communication with the Internet. The network 630 in some cases is a telecommunication or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, a method for users to transmit data and redeem rewards from tokens. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, be a machine learning algorithm used to generate a message recommendation.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system, comprising:
   a computerized user device of a contributor that is configured to execute application programs including,
   (a) a developer application of a stakeholder, the developer application being configured to request one or more predetermined types of data from the contributor selected from a group consisting of gender, age, ethnicity, location, physical address, occupation, marital status, education, number of children, income, hobbies, interests, favorite brands, and favorite websites of the contributor; and
   (b) a central application, controlled by a central organization that is different from the stakeholder and the contributor, configured to: (i) maintain, for the contributor, a contributor profile integrated within a self-sovereign identity (SSI) solution that allows a contributor to unify interactions actions across multiple applications and devices comprising one or more of the predetermined types of data as contributor profile characteristics, (ii) enable the contributor to select and deselect a combination of the one or more contributor profile characteristics, (iii) securely transfer contributor data based on the selected contributor profile characteristics, and (iv) maintain, for the contributor, a token wallet enabling the contributor to perform one or more activities selected from the group consisting of: input and manage personal data, purchase intent, purchase history, or other profile data, link social media or other online accounts to propagate data on the data exchange, register a smart contract address linked to the token wallet, view a balance of the token wallet, receive payments, view one or more applications linked to the contributor's SSI, backup or export wallet data or keys, recover a contributor's identity or personal information, and interact with one or more marketplaces; and
   an additional computerized system in communication over a network with the developer application and the central application executing on the computerized user device, the additional computerized system being configured to execute one or more additional system components, to perform one or more operations on the contributor data, and to perform token transactions between the contributor and the stakeholder using a decentralized blockchain architecture, the additional computerized system including a data exchange that aggregates and processes data from one or more contributors to form a data taxonomy for one or more stakeholders;
   whereby the system uses a hybrid centralized-decentralized architecture including the central application, controlled by the central organization, with the decentralized blockchain architecture to facilitate interactions between the contributor and the stakeholder.

2. The system of claim 1, wherein the central application is configured to access data stored on one or more social networks and extract content from the one or more social networks.

3. The system of claim 1, wherein the stakeholder is a company, wherein the company includes one or more brands.

4. The system of claim 1, wherein the developer application enables the contributor to interact with content, wherein the content comprises games, videos, and surveys.

5. The system of claim 4, wherein the developer application enables the contributor to perform token transactions.

6. The system of claim 1, wherein the developer application passively collects transaction data from the contributor.

7. The system of claim 1, wherein the developer application requests the data from the contributor irregularly.

8. The system of claim 1, wherein the developer application requests the data from the contributor periodically.

9. The system of claim 1, wherein the decentralized blockchain architecture includes a distributed network of databases.

10. The system of claim 9, wherein the distributed network of databases include a decentralized ledger.

11. The system of claim 1, wherein the SSI allows a user contributor to store a digital identifier on a public blockchain ledger.

* * * * *